N. ERZIG.
POST HOLE DIGGER.
APPLICATION FILED OCT. 16, 1911.
1,067,417.
Patented July 15, 1913.
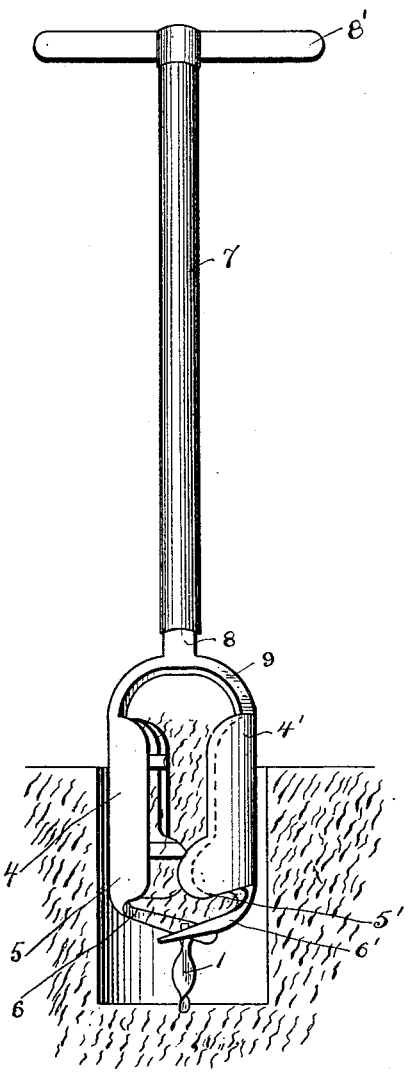
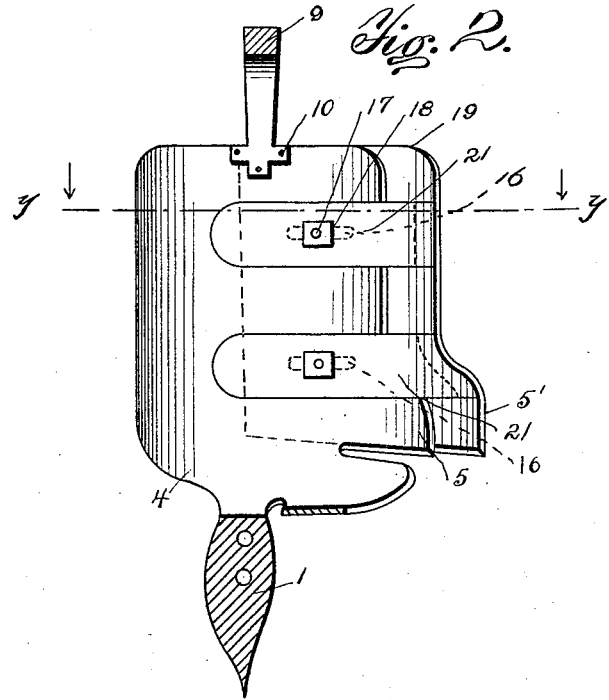
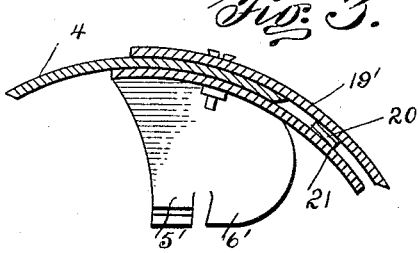
WITNESSES:
INVENTOR
Nickolaus Erzig
BY
Alex. J. Wedderburn, jr.
ATTORNEY

UNITED STATES PATENT OFFICE.

NICKOLAUS ERZIG, OF CHICAGO, ILLINOIS.

POST-HOLE DIGGER.

1,067,417. Specification of Letters Patent. Patented July 15, 1913.

Application filed October 16, 1911. Serial No. 654,911.

*To all whom it may concern:*

Be it known that I, NICKOLAUS ERZIG, citizen of the United States, residing at Chicago, in the county of Cook and State of Illinois, have invented certain new and useful Improvements in Post-Hole Diggers, of which the following is a specification.

This invention relates to improvements in post hole diggers and the object of my invention is to provide adjustable blades upon the oppositely arranged and diagonally adjusted blades mounted upon an auger of the tool in order that the diameter of the cut of said last named blades may be suitably enlarged and a corresponding opening in the ground dug.

With the above and other objects in view my invention consists in the combination, arrangements and details of construction clearly shown in the drawings and then more particularly pointed out in the appended claims.

Similar reference numerals designate similar parts throughout the respective views, wherein—

Figure 1 is an elevational view of my device shown in operation, Fig. 2 is an enlarged elevational view of a modified form of the invention, and Fig. 3 is a sectional view taken on line Y—Y of Fig. 2.

The post hole digger comprises a drill member or auger connected to the blade members 4 and 4' which are segmental in shape and perform the duty of throwing over and between their inner walls, the soil excavated by the auger. The shape of each blade member 4 and 4' is substantially as shown to which shape my auxiliary adjustable blades 19 conform. An upper nose projection and a wing projection 6 are formed upon the blades 4 and 4' and both blades are bent inwardly in the manner shown in Fig. 1. The crank handle 8' is mounted on the handle rod 7 and the brace extension 9 thereof is connected to the upper free ends of said blades 4 and 4' by any suitable means such as screw bolts 10.

The form of implement just described may be varied and my adjustable auxiliary blades correspondingly conformed thereto.

The auxiliary blade members 19 are also segmental in shape and overlie blades 4 and 4' at diagonally opposite points when in normal position. A plurality of slots 16 are formed upon the blades 4 and 4' from which project screw bolts 17 tapped through the auxiliary blades 19 upon which nuts 18 are turned to clamp the auxiliary blades in position against the blades 4 and 4' so that when the nuts are released the working edges of said auxiliary blades may be moved within the plane or outside the plane of said primary blades.

Arms 21 are arranged to engage the inner sides of the primary blades and connected by space members 20 to the auxiliary blades 19 which overlie the opposite sides of the primary blades so that the screw bolt 18 passing through the slots 16 in said primary blades may be by nuts 18 clamped or extended in retracted position as above described.

From the above it is obvious that as the improvement is used without the auxiliary blades a uniform cut will be the invariable consequence and that by the attachment of my adjustable blades to the primary blades of the tool the diameter of the cut of the primary blades may be varied.

It is obvious that other means may be supplied for adjusting the auxiliary blades relative to the primary blades without departing from the essence of my invention.

I claim and desire to secure by Letters Patent:

1. A post hole digger comprising an augur, oppositely arranged and vertically disposed blades mounted on said auger, a handle spanning said opposite blades, auxiliary blades having terminal arms overlying said blades at diagonally opposite ends, by means of which the diameter of said auger may be enlarged.

2. In combination with a post hole digger having an auger, oppositely arranged and vertically disposed segmental blades connected to said auger, segmental members each having one edge correspondingly shaped to said blades, a plurality of arms similarly curved over the body of each segmental member between which and said members said blades are received, each blade formed with a plurality of longitudinal slots, bolts tapped through said slots, and nuts at the free ends of said bolts for adjustably holding said members in set position, and a handle for said auger.

In testimony whereof I affix my signature in presence of two witnesses.

NICKOLAUS ERZIG.

Witnesses:
NICHOLAS ERZIG,
HOWARD LEE EMERSON.

Copies of this patent may be obtained for five cents each, by addressing the "Commissioner of Patents, Washington, D. C."